United States Patent Office 3,420,855
Patented Jan. 7, 1969

3,420,855
SYNTHESIS OF STEROIDS
Seymour D. Levine, North Brunswick, N.J., assignor to
E. R. Squibb & Sons, Inc., New York, N.Y., a corporation of Delaware
No Drawing. Filed Mar. 17, 1966, Ser. No. 534,997
U.S. Cl. 260—346.2                    8 Claims
Int. Cl. C07d 101/00; C07d 5/32

ABSTRACT OF THE DISCLOSURE

This invention relates to novel 3-oxa-A-nor steroids having antiandrogenic activity.

---

This invention relates to and has as its object the provision of novel physiologically active steroids, methods for their production and novel intermediates useful in said preparation. More particularly, this invention relates to the production of steroids of the formula

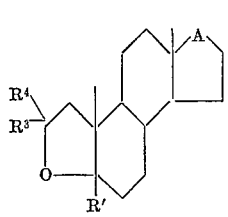

wherein A is selected from the group consisting of

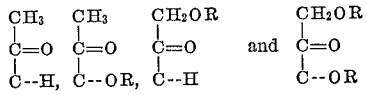

R is selected from the group consistng of hydrogen and acyl; R' is selected from the group consisting of α-hydrogen and β-hydrogen; $R^3$ and $R^4$ are hydrogen and together $R^3$ and $R^4$ is oxo (O=).

The acyl radicals preferred in the operation if this invention are those of hydrocarbon carboxylic acids of less than twelve carbon atoms, as exemplified by the lower alkanoic acids (e.g., acetic, propionic, butyric and tert-pentanoic acid), the lower alkenoic acids, the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cycloalkene carboxylic acids.

The final products of this invention are physiologically active steroids and possess antiandrogenic activity, i.e., they inhibit the action of androgens. The final products of this invention may be used in the treatment of such conditions as hyperandrogenic acne and they may be formulated for such administration, the concentration and/or dosage being based on the activity of the particular compound and the requirements of the patient.

The compounds of the instant invention may be prepared by the processes of this invention beginning with A-norprogesterone as starting material. The processes of this invention may be represented by the following equations:

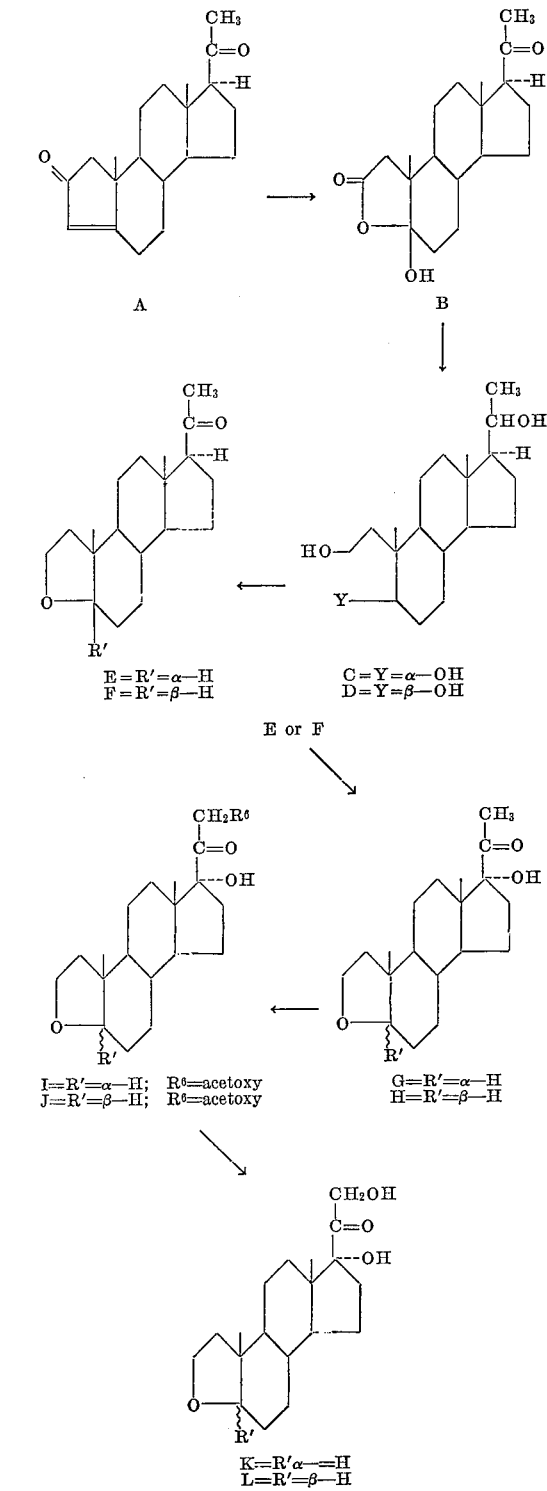

In the first step of the processes of this invention, A- norprogesterone is oxidized by the novel process of this invention. It has been found treating this starting material with potassium permanganate-sodium metaperiodate, it will yield the 3-oxa-A-norpregnane-5β-ol-2,20-dione intermediate of the invention, Compound B.

Compound B may be reduced by treating it with a reducing agent such as lithium aluminum hydride to yield the 5α- and 5β-derivatives of the 2,5-seco-3,4-bisnorpregnane intermediates of this invetnion, Compound C and Comopund D.

Compound D may be treated with phosphorus oxychloride followed by treatment with chromic acid in sulfuric acid (Jones reagent) to yield 3-oxa-5α-A-norpregnane, Compound E. Treating Compound C with perchloric acid and Jones reagent yields 3-oxa-5β-A-norpregnane, Compound F.

The new 17α-hydroxy compounds (Compounds G and H) may be prepared by formation of the 17(20)-enol acetate, utilizing acetic anhydride and perchloric acid, peracid epoxidation, and treatment with a base, such as potassium hydroxide or sodium hydroxide in lower alkyl alcohol, e.g., methanol, butanol, and the like.

Further, Compounds G and H may be reacted with calcium oxide and calcium hydroxide and the acylating agent to form the 21-acetoxy compounds of this invention, Compounds I and J.

Compounds I and J may be hydrolyzed under mild conditions, e.g., one equivalent of potassium carbonate in alcohol to yield the 17α,21-dihydroxy derivatives of this invention, Compounds K and L.

In order to prepare the desired 17α-acyl derivatives of the instant invention, the respective hydroxy compounds may be treated with an acylating agent, such as an acyl anhydride in the presence of a perchloric acid. To prepare the desired 17,21-diacylated compounds of the instant invention, the 17,21-dihydroxy compounds may be treated in a similar manner.

Further, Compounds E and F may be reacted with calcium oxide and calcium hydroxide and an acylating agent to form the 21-acetoxy compounds of this invention. These compounds may be hydrolyzed with either acid or base to yield the 21-hydroxy derivatives.

The invention may be illustrated by the following examples, all temperatures are in degrees centigrade unless otherwise stated:

EXAMPLE 1

3-oxa-A-norpregnane-5β-ol-2,20-dione

A solution of 500 mg. of A-norprogesterone in 75 ml. of t-butanol is treated with a suspension of 690 mg. of potassium carbonate, 90 mg. of potassium permanganate, and 2.86 g. of sodium metaperiodate in 75 ml. of water and stirred overnight at room temperature. The reaction mixture is diluted with water and extracted with ether. The aqueous phase is acidified and extracted with chloroform. The chloroform extracts are washed with 8% salt solution, dried over sodium sulfate and evaporated. The residue is crystallized from acetone-isopropyl ether to give 268 mg. of 3-oxa-A-norpregnane-5β-ol-2,20-dione, M.P. 160–161°. Recrystallization from acetone-isopropyl ether gives the analytical sample: M.P. 160–161°; $[\alpha]_D^{25}$ +99° (chf.);

$\lambda^{KBr}$ 3.00, 5.73, 5.87μ; $\tau_{CDCl_3}^{TMS}$ 9.35 (s., 18-Me), 8.88 (s., 19-Me), 7.88 (s., 21-Me) and 4.98 (m., 5β-OH)

Analysis.—Calc'd for $C_{19}H_{28}O_4$ (320.41): C, 71.22; H, 8.81. Found: C, 71.31; H, 8.71.

EXAMPLE 2

2,5-seco-3,4-bisnorpregnane-2,5β,20β-triol and 2,5-seco-3,4-bisnorpregnane-2,5α,20β-triol A mixture of 210 mg. of 3-oxa-A-norpregnane-5β-ol-2,20-dione and 250 mg. of lithium aluminum hydride in 5 ml. of ether and 5 ml. of tetrahydrofuran is refluxed for one day. The reaction mixture is treated with water and 2 N hydrochloric acid and the organic solvents evaporated. The aqueous phase is filtered and the precipitate heated in methanol. The methanol solution is filtered and evaporated to dryness. The residue is crystallized from methanol isopropyl ether to give 73 mg. of 2,5-seco-3,4-bisnorpregnane-2,5β,20β-triol, M.P. 201.5–203.5°. The mother liquor is a mixture of the 5β- and 5α-ols.

Recrystallization from acetonitrile gives the analytical sample: M.P. 213.5–215.5°; $[\alpha]_D^{26}$ +2° (MeOH);

$\lambda^{KBr}$ 3.09μ

Analysis.—Calc'd for $C_{19}H_{34}O_3$ (310.46): C, 73.50; H, 11.04 Found: C, 73.46; H, 10.99.

EXAMPLE 3

3-oxa-5α-A-norpregnane-20-one

A solution of 1.28 g. of 2,5-seco-3,4-bisnorpregnane-2,5β,20β-triol in 20 ml. of phosphorus oxychloride is left at room temperature for sixteen hours. The reaction mixture is poured into ice-water and chloroform and neutralized with sodium carbonate. The chloroform layer is separated and the aqueous layer extracted with additional chloroform. The chloroform extracts are washed with 8% salt solution, dried over sodium sulfate and evaporated. Plate chromatography of the residue on neutral alumina (activity V) using chloroform-hexane (1:1) as the developing solvent gives two major bands detectable with iodine. The second band is eluted with ethyl acetate and the residue di solved in 10 ml. of acetone and treated with an excess of Jones reagent. Methanol is added to decompose excess Jones reagent and the solution evaporated and treated with water. The aqueous phase is extracted with ether and the ether extracts washed with 8% salt solution, dried over sodium sulfate and evaporated. Plate chromatography of the residue on neutral alumina (activity V) using hexane-chloroform (4:1) as the developing solvent gives a major band detectable with iodine. Elution with ethyl acetate and crystallization from isopropyl ether-petroleum ether gives 80 mg. of 3-oxa-5α-A-norpregnane-20-one, M.P. 101.5–102.5°. Recrystallization from ether-petroleum ether gives the analytical sample: M.P. 108.5–109.5°;

$\lambda^{KBr}$ 5.86μ; $\tau_{CDCl_3}^{TMS}$ 9.37 (s., 18-Me), 9.18 (s.,19-Me), 7.90 (s., 21-Me), 6.95 (m., 5α-H) and 6.11 (q., 2-CH₂)

Analysis.—Calc'd for $C_{19}H_{30}O_2$ (290.43): C, 78.57; H, 10.41. Found: C, 78.39; H, 10.68.

EXAMPLE 4

3-oxa-5β-A-norpregnane-20-one

The mother liquor (1.9 g.) from the reduction of 6 g. of 3 - oxa - A - norpregnane - 5β - ol-2,20-dione with lithium aluminum hydride as in Example 2 is stirred for four hours at room temperature in 60 ml. of acetone containing 0.5 ml. of 70% perchloric acid. This solution is treated dropwise with an excess of Jones reagent. Methanol is added to decompose excess Jones reagent and the solution evaporated, treated with water and extracted with ether. The ether extracts are washed with 8% salt solution, dried over sodium sulfate and evaporated. Plate chromatography of the residue on neutral alumina (activity V) using hexane-chloroform (1:1) as the developing solvent gives three bands. Elution of band 1 with ethyl acetate and crystallization from petroleum ether gives 399 mg. of 3 - oxa - A - norpregnane-20-one, M.P. 128–130°. Recrystallization from petroleum ether gives the analytical sample: M.P. 130–131.5°, $\lambda^{KBr}$ 5.90μ; $\tau_{CDCl_3}^{TMS}$ 9.36 (s., 18-Me), 904 (s., 19-Me), 7.89 (s., 21-Me), 6.55 (t., $J_T$=6 cps., 5β-H)

*Analysis.*—Calc'd for $C_{19}H_{30}O_2$ (290.43): C, 78.57; H, 10.41. Found: C, 78.16; H, 10.18.

Elution of band 2 with ethyl acetate and crystallization from isopropyl ether gives 3-oxa-5α-A-norpregnane-2,20-dione, M.P. 168–170°. Recrystallization from isopropyl ether gives the anlytical sample: M.P. 178.5–179.5°;

$\lambda^{KBr}$ 5.65 and 5.88μ; $\tau^{TMS}_{CDCl_3}$ 9.36 (s., 18-Me), 9.01 (s., 19-Me), 7.90 (s., 21-Me) and 6 18 (q., J=4 cps., 11 cps., 5α-H)

EXAMPLE 5

17α-hydroxy-3-oxa-5α-A-norpregnane-20-one

An ice-cold solution of 1.5 ml. of acetic anhydride containing three drops of 70% perchloric acid is added to a solution of 230 mg. of 3-oxa-5α-A-norpregnane-20-one in 8 ml. of carbon tetrachloride and 20 ml. of benzene and left at room temperature for four hours. The reaction mixture is poured into ice-water and additional carbon tetrachloride is added. The organic layer is separated and washed with a saturated sodium bicarbonate solution, 8% salt solution, dried over sodium sulfate and evaporated. The residue is dissolved in 5 ml. of chloroform and treated with 175 mg. of m-chloroperbenzoic acid and stirred at room temperature for 3.5 hours. The chloroform solution is washed with 5% sodium hydroxide solution, 8% salt solution, dried over sodium sulfate, and evaporated. The residue is treated with 5 ml. of methanol containing 0.3 g. of potassium hydroxide and warmed on a steam bath for a few minutes. The reaction mixture is then stirred at room temperature for 0.5 hour, diluted with water and extracted with chloroform. The chloroform extracts are washed with a 2 N hydrochloric acid solution, 8% salt solution, dried over sodium sulfate and evaporated to give 17α-hydroxy-3-oxa-5α-A-norpregnane-20-one.

EXAMPLE 6

17α-hydroxy-3-oxa-5β-A-norpregnane-20-one

Following the procedure in Example 5 but substituting 3-oxa-5β-A-norpregnane-20-one for 3-oxa-5α-A-norpregnane-20-one there is obtained 17α-hydroxy-3-oxa-5β-A-norpregnane-20-one.

EXAMPLE 7

17α-acetoxy-3-oxa-5β-A-norpregnane-20-one

The compound described in Example 6 is treated at room temperature with acetic anhydride and perchloric acid. The product formed is 17α-acetoxy-3-oxa-5β-A-norpregnane-20-one.

EXAMPLE 8

17α-acetoxy-3-oxa-5α-A-norpregnane-20-one

The compound described in Example 5 is treated at room temperature with acetic anhydride and perchloric acid. The product formed is 17α-acetoxy-3-oxa-5α-A-norpregnane-20-one.

EXAMPLE 9

21-acetoxy-3-oxa-5α-A-norpregnane-20-one

A solution of 500 mg. of 3-oxa-5α-A-norpregnane-20-one in 3 ml. of chloroform and 2 ml. of methanol is treated with 500 mg. of calcium oxide and 25 mg. of calcium hydroxide. The reaction mixture is cooled in an ice-water bath and a solution of 450 mg. of iodine in 2 ml. of tetrahydrofuran and 2 ml. of methanol is added dropwise while stirring. The reaction mixture is filtered, washed with methanol and evaporated. The residue is dissolved in chloroform and washed with 5% aqueous sodium bisulfite solution, 8% salt solution, dried over sodium sulfate and evaporated. The residue in 10 ml. of dimethyl formamide is treated with 2 g. of potassium acetate and warmed at 60° for four hours while stirring. The reaction mixture is diluted with water and extracted with chloroform. The chloroform extracts are washed with 8% salt solution, dried over sodium sulfate and evaporated to give 21-acetoxy-3-oxa-5α-norpregnane-20-one.

Following the procedure in the above example but substituting the compounds in column A for 3-oxa-5α-A-norpregnane-20-one there are obtained the compounds in column B.

| Examples | Column A | Column B |
| --- | --- | --- |
| 10 | 3-oxa-5β-A-norpregnane-20-one. | 21-acetoxy-3-oxa-5β-A-norpregnane-20-one. |
| 11 | 17α-hydroxy-3-oxa-5α-A-norpregnane-20-one. | 17α-hydroxy-21-acetoxy-3-oxa-5α-A-norpregnane-20-one. |
| 12 | 17α-hydroxy-3-oxa-5β-A-norpregnane-20-one. | 17α-hydroxy-21-acetoxy-3-oxa-5β-A-norpregnane-20-one. |

The invention may be variously otherwise embodied within the scope of the appended claims.

What is claimed is:

1. A compound having the formula

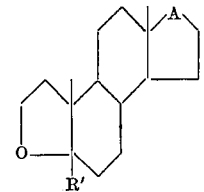

wherein A is selected from the group consisting of

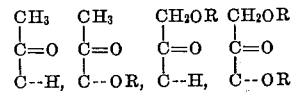

R is selected from the group consisting of hydrogen and acyl wherein the acyl is a hydrocarbon carboxylic acid of less than twelve carbons; R' is selected from the group consisting of α-hydrogen and β-hydrogen.

2. A compound in accordance with the formula of claim 1 having the name 3-oxa-5α-A-norpregnane-20-one.

3. A compound in accordance with the formula of claim 1 having the name 3-oxa-5β-A-norpregnane-20-one.

4. A compound in accordance with the formula of claim 1 having the name 17α-hydroxy-3-oxa-5α-A-norpregnane-20-one.

5. A compound in accordance with the formula of claim 1 having the name 17α-hydroxy-3-oxa-5β-A-norpregnane-20-one.

6. A compound in accordance with the formula of claim 1 having the name 17α,21-dihydroxy-3-oxa-5β-A-norpregnane-20-one.

7. A compound in accordance with the formula of claim 1 having the name 17α,21-dihydroxy-3-oxa-5α-A-norpregnane-20-one.

8. A compound is accordance with claim 1 having the name 21-hydroxy-3-oxa-5α-A-norpregnane-20-one.

References Cited

Levine, S. D.: Journal of Medicinal Chem., vol. 8 (4), pp. 537–9 (July 1963).

ALEX MAZEL, *Primary Examiner.*

B. I. PENTZ, *Assistant Examiner.*

U.S. Cl. X.R.

260—617, 999